(12) United States Patent
Agrawal et al.

(10) Patent No.: US 9,010,424 B2
(45) Date of Patent: Apr. 21, 2015

(54) HIGH PERMEABILITY FRAC PROPPANT

(75) Inventors: Gaurav Agrawal, Aurora, CO (US);
James B. Crews, Willis, TX (US);
Zhiyue Xu, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 395 days.

(21) Appl. No.: 13/430,184

(22) Filed: Mar. 26, 2012

(65) Prior Publication Data
US 2012/0247765 A1 Oct. 4, 2012

Related U.S. Application Data

(60) Provisional application No. 61/468,921, filed on Mar. 29, 2011.

(51) Int. Cl.
*E21B 43/267* (2006.01)
*C09K 8/80* (2006.01)
*C09K 8/68* (2006.01)

(52) U.S. Cl.
CPC .............. *E21B 43/267* (2013.01); *C09K 8/68* (2013.01); *C09K 8/80* (2013.01); *C09K 8/805* (2013.01)

(58) Field of Classification Search
CPC ............ C09K 8/80; C09K 8/68; C09K 8/805; E21B 43/267; E21B 43/26
See application file for complete search history.

(56) References Cited

U.S. PATENT DOCUMENTS

| | | |
|---|---|---|
| 3,173,484 A | 3/1965 | Huitt et al. |
| 3,237,693 A | 3/1966 | Huitt et al. |
| 7,581,590 B2 | 9/2009 | Lesko et al. |
| 2005/0059558 A1* | 3/2005 | Blauch et al. ............ 507/203 |
| 2005/0074612 A1 | 4/2005 | Eklund et al. |
| 2005/0130848 A1 | 6/2005 | Todd et al. |

(Continued)

FOREIGN PATENT DOCUMENTS

| | | |
|---|---|---|
| WO | 2008025751 A1 | 3/2008 |
| WO | 2008079485 A2 | 7/2008 |
| WO | 2010146493 A1 | 12/2010 |

OTHER PUBLICATIONS

Schlumberger, "Achieve Infinite Fracture Conductivity," Journal of Petroleum Technology, Aug. 2010, vol. 62, No. 8, advertisement on inside cover.

(Continued)

*Primary Examiner* — Zakiya W Bates
(74) *Attorney, Agent, or Firm* — Mossman Kumar & Tyler PC

(57) ABSTRACT

Disintegrative particles are designed to be blended with and pumped with typical proppant materials, e.g. sand, ceramics, bauxite, etc, into the fractures of a subterranean formation. With time and/or change in wellbore or environmental condition, these particles will either disintegrate partially or completely, in non-limiting examples, by contact with downhole fracturing fluid, formation water, or a stimulation fluid such as an acid or brine. Once disintegrated, the proppant pack within the fractures will lead to greater open space enabling higher conductivity and flow rates. The disintegrative particles may be made by compacting and/or sintering metal powder particles, for instance magnesium or other reactive metal or their alloys. Alternatively, particles coated with compacted and/or sintered nanometer-sized or micrometer sized coatings could also be designed where the coatings disintegrate faster or slower than the core in a changed downhole environment.

20 Claims, 5 Drawing Sheets

(56) References Cited

U.S. PATENT DOCUMENTS

| | | | |
|---|---|---|---|
| 2006/0048943 A1 | 3/2006 | Parker et al. | |
| 2008/0135242 A1 | 6/2008 | Lesko et al. | |
| 2009/0288820 A1 | 11/2009 | Barron et al. | |
| 2010/0089581 A1 | 4/2010 | Nguyen et al. | |
| 2011/0135953 A1 | 6/2011 | Xu et al. | |
| 2011/0155372 A1* | 6/2011 | Panga et al. | 166/278 |
| 2011/0240293 A1* | 10/2011 | Lesko et al. | 166/280.1 |

OTHER PUBLICATIONS

D. Denny, "Technical Applications: Flow-Channel Fracturing," Journal of Petroleum Technology, Jul. 2010, vol. 62, No. 7, p. 20.

Examination Report in CA Application No. 2830409, dated Nov. 5, 2014.

Office Action in CA Application No. 2830409, dated Nov. 20, 2014.

* cited by examiner

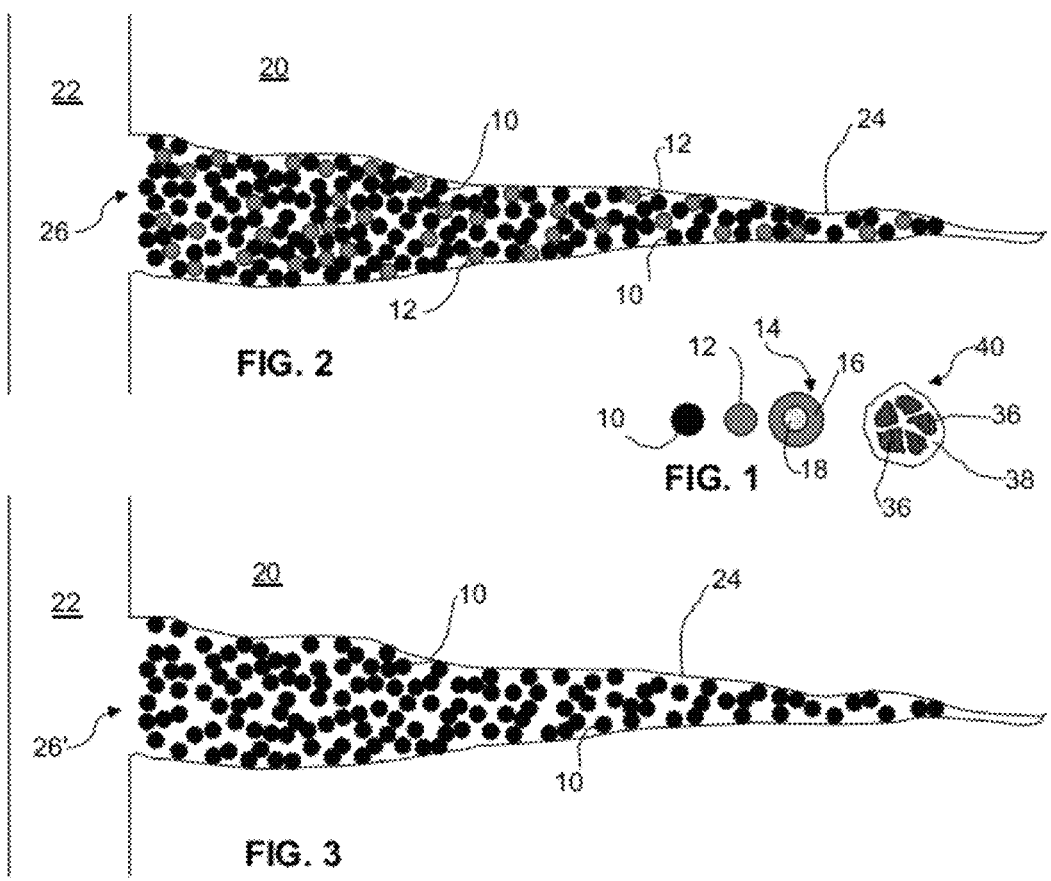

HIGH PERMEABILITY FRAC PROPPANT

CROSS-REFERENCE TO RELATED APPLICATION

This application claims the benefit of U.S. Provisional Patent Application No. 61/468,921 filed Mar. 29, 2011, which is incorporated herein in its entirety by reference.

TECHNICAL FIELD

The present invention relates to compositions and methods for providing a high permeability proppant pack, and more particularly relates, in one non-limiting embodiment, to compositions and methods for providing a high permeability proppant pack that involves removing a portion of the initially placed proppant pack.

TECHNICAL BACKGROUND

Hydraulic fracturing is a process commonly used to increase the flow of desirable fluids, such as oil and gas, from a portion of a subterranean formation. Hydraulic fracturing operations generally involve placing a viscous fracturing fluid into a subterranean formation or zone at a rate and pressure sufficient to cause the formation or zone to break down with the attendant production of one or more fractures—typically multiple fractures. The pressure required to induce fractures in rock at a given depth is known as the "fracture gradient."

Nearly any fluid given enough volume and pressure can be used to fracture a subterranean formation. However, fracturing fluids generally include a viscosifying or gelling agent such as a cross-linked or uncross-linked polysaccharide material, and/or a viscoelastic surfactant, to affect the rheology by increasing viscosity of the fluid.

Typically, one or more fluids function to carry and transport proppant into the created fracture and form a proppant pack that keeps the fracture open once the pressure is released and the overburden is permitted to settle. As the viscous fracturing fluid leaks off into the formation, dehydrating the fluid, particulates (proppants and other particles) aggregate in proppant packs within the fracture. The proppant packs function to prevent the fracture from fully closing upon the release of pressure, forming conductive channels through which fluids may flow to (or from) the wellbore. The proppant pack is also designed to provide a higher permeability zone than the surrounding rock from which it is desired to produce hydrocarbons. The higher the permeability of the proppant pack, the greater is the potential for the production of hydrocarbons.

Accordingly, it is desired to provide compositions and methods which provide relatively high permeability proppant packs within fractures to enhance the production of hydrocarbons from the fractured subterranean formation.

SUMMARY

There is provided in one non-limiting embodiment a method for increasing the permeability of a proppant pack within a fracture. The method involves introducing into at least a portion of a fracture in a subterranean formation a mixture of a plurality of proppants and a plurality of particles to form a proppant pack. At least a portion of the particles is disintegrative. The method further involves disintegrating at least a portion of the particles to create a proppant pack having a relatively higher permeability as compared with the proppant pack prior to the disintegrating.

There is additionally provided in one non-restrictive version, a mixture including a plurality of proppants and a plurality of particles, where at least a portion of the particles is disintegrative metal.

BRIEF DESCRIPTION OF THE DRAWINGS

FIG. 1 is a non-limiting, schematic illustration of a proppant and three types of particles with disintegrative portions thereof;

FIG. 2 is a schematic illustration of totally disintegrative particles and proppants placed in fracture in a relatively uniform, homogeneous mixture, in one non-limiting embodiment;

FIG. 3 is an illustration of the fracture schematically depicted in FIG. 2 after all of the totally disintegrative particles have been removed;

Figure 4:
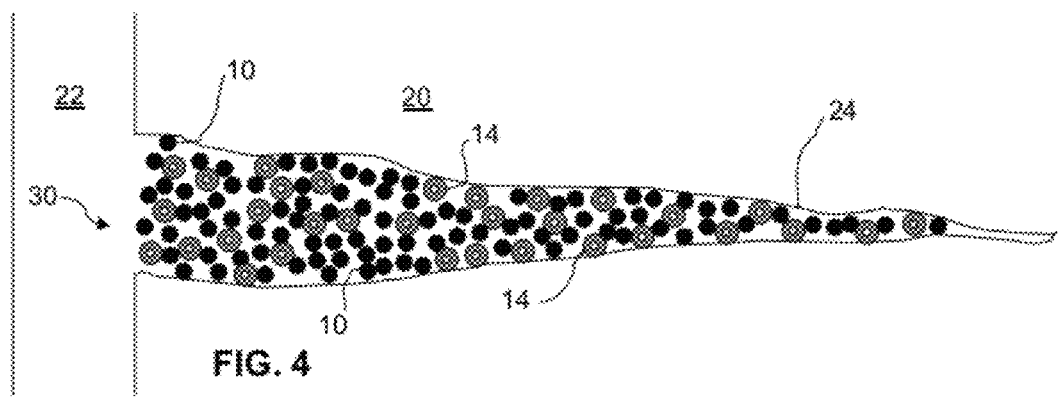
FIG. 4 is a schematic illustration of particles having two differentially disintegrative portions thereof (e.g. coatings on cores) and proppants placed in fracture in a relatively uniform, homogeneous mixture, in another non-limiting embodiment.
Figure 5:
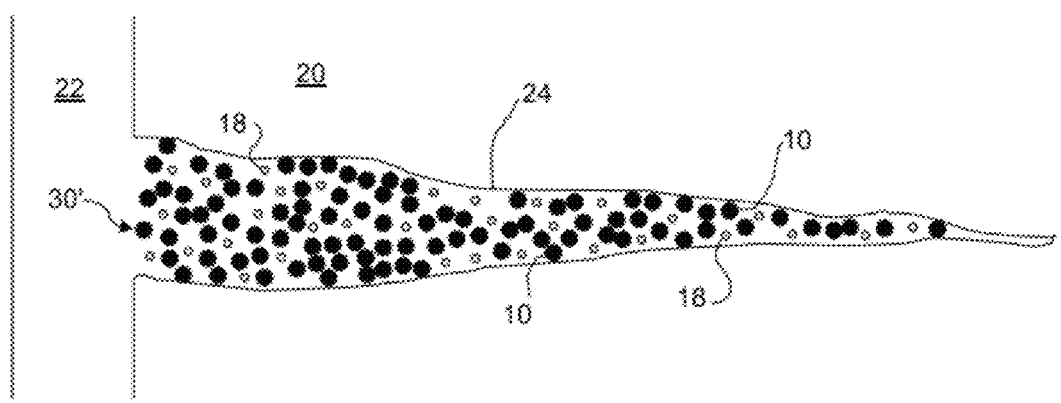
FIG. 5 is an illustration of the fracture schematically depicted in FIG. 4 after the disintegrative coatings have been completely removed from the particles.

It will be appreciated that the various structures and parts thereof schematically shown in FIGS. 1-6 are not necessarily to scale or proportion since many proportions and features have been exaggerated for clarity and illustration.

DETAILED DESCRIPTION

A method has been discovered for forming relatively high permeability proppant packs in hydraulic fractures that involves the use of at least partially disintegrative particles blended with typical proppant material. The disintegrative particles are designed to be pumpable along with the conventional proppant material—e.g. sand, ceramics, bauxite etc.—in a frac fluid formulation. With time these particles will either disintegrate partially or completely in downhole formation water, fracturing fluid (i.e. mix water brine) and other fluids. Some of these particles may disintegrate in hydrocarbons if the hydrocarbons contain $H_2S$, $CO_2$, and other acid gases that cause disintegration of the materials. Oxides, nitrides, carbides, intermetallics or ceramic coatings or particle components resistant to some of these fluids or conditions may be additionally or alternatively dissolved with another stimulation or cleanup fluid such as an acid-based or brine-based fluid. Once disintegrated, the proppant pack within the fractures will lead to greater open space enabling a higher flow rate.

The disintegrative (disintegrate-able) portions of the particles may be lightweight, high-strength and selectably and controllably degradable materials include fully-dense, sintered powder compacts formed from coated powder materials that include various lightweight particle cores and core materials having various single layer and multilayer micron-scale and/or nanoscale coatings. These powder compacts are made from coated metallic powders that include various electrochemically-active (e.g. having relatively higher standard oxidation potentials), lightweight, high-strength particle cores and core materials, or materials that comprise all of the particles, such as electrochemically active metals, that are dispersed within a cellular nanomatrix formed from the various nanoscale metallic and/or non-metallic coating layers of metallic or non-metallic coating materials, and which are particularly useful in wellbore applications. These powder compacts provide a unique and advantageous combination of mechanical strength properties, such as compression and shear strength, low density and selectable and controllable corrosion properties, particularly rapid and controlled dissolution in various wellbore fluids. For example, the particle core and coating layers of these powders may be selected to provide sintered powder compacts suitable for use as high strength engineered materials having a compressive strength and shear strength comparable to various other engineered materials, including carbon, stainless and alloy steels, but which also have a low density comparable to various polymers, elastomers, low-density porous ceramics and composite materials. As yet another example, these powders and powder compact materials may be configured to provide a selectable and controllable degradation, disintegration or disposal in response to a change in an environmental condition, such as a transition from a very low dissolution rate to a very rapid dissolution rate in response to a change in a property or condition of a wellbore proximate an article formed from the compact, including a property change in a wellbore fluid that is in contact with the powder compact. The selectable and controllable degradation or disposal characteristics described also allow the dimensional stability and strength of materials to be maintained until the particles are no longer needed, at which time a predetermined environmental condition, such as a wellbore condition, including wellbore fluid temperature, pressure or pH value, salt or brine composition, and may be changed to promote their removal by rapid dissolution. These coated powder materials and powder compacts and engineered materials formed from them, as well as methods of making them, are described further below. In one non-limiting embodiment, these disintegrative metals may be called controlled electrolytic metallics or CEM.

Disintegrative proppant materials may be created with technology previously described in U.S. Patent Application Publication No. 2011/0135953 A1, incorporated by reference herein in its entirety. Magnesium or other reactive materials could be used in the powders to make the disintegrative metal portions, for instance, magnesium, aluminum, zinc, manganese, molybdenum, tungsten, copper, iron, calcium, cobalt, tantalum, rhenium, nickel, silicon, rare earth elements, and alloys thereof and combinations thereof. The alloys may be binary, tertiary or quaternary alloys. As used herein, rare earth elements include Sc; Y; lanthanide series elements, including La, Ce, Pr, Nd, Pm, Sm, Eu, Gd, Te, Dy, Ho, Er, Tm, or Lu; or actinide series elements, including Ac, Th, Pa, U, Np, Pu, Am, Cm, Bk, Cf, Bk, Cf, Es, Fm, Md, or No; or a combination of rare earth elements. These metals may be used as pure metals or in any combination with one another, including various alloy combinations of these materials, including binary, tertiary, or quaternary alloys of these materials. Nanoscale metallic and/or non-metallic coatings could be applied to these electrochemically active metallic particles to further strengthen the material and to provide a means to accelerate or decelerate the disintegrating rate. Disintegrative enhancement additives include, but are not necessarily limited to, magnesium, aluminum, nickel, iron, cobalt, copper, tungsten, rare earth elements, and alloys thereof and combinations thereof. It will be observed that some elements are common to both lists, that is, those metals which can form disintegrative metals and disintegrative metal compacts and those which can enhance such metals and/or compacts. The function of the metals, alloys or combinations depends upon what metal or alloy is selected as the major composition or powder particle core first. Then the relative disintegrative rate depends on the value of the standard potential of the additive or coating relative to that of the core. For instance, to make a relatively more slowly disintegrating core, the additive or coating composition needs to have lower standard potential than that of the core. An aluminum core with a magnesium coating is a suitable example. Or, to make this core dissolve faster, standard potential of the core needs to be lower than that of coating. An example of this latter situation would be a magnesium particle with a nickel coating.

These electrochemically active metals or metals with nanoscale coatings can be very reactive with a number of common wellbore fluids, including any number of ionic fluids or highly polar fluids. Examples include fluids comprising sodium chloride (NaCl), potassium chloride (KCl), hydrochloric acid (HCl), calcium chloride ($CaCl_2$), sodium bromide (NaBr), calcium bromide ($CaBr_2$), zinc bromide ($ZnBr_2$), potassium formate, or cesium formate.

Alternatively, relatively non-disintegrative particles coated with nanometer-range thick or micron-range thick metallic and/or non-metallic coatings could be designed so that only the coatings disintegrate in downhole environment while the rest of the particles remain in place as part of the proppant pack. For instance, these non-disintegrative particles include high strength intermetallic particles or ceramic particles of oxides, nitrides, carbides. The particles could be solid or hollow. The disintegrative coatings include, and are not necessarily limited to, the reactive metals with corrosion enhancement coatings mentioned in above. It will be appreciated that in the embodiment where there is a disintegrative coating over all or a majority of a disintegrative core, there may be applications where the coating should be relatively more easily disintegrated than the core, and other applications where the core is relatively more easily disintegrated than the coating. Indeed, multiple coatings over a core may be used to provide further control over the disintegration of the particles. Combinations of different fluids and particles with different layers or portions that disintegrate at different rates will provide many ways to design and control the increase of the permeability of the proppant pack.

More specifically, a new fracture fluid formulation which includes a component of particles that disintegrate in downhole environments has been discovered. In one non-limiting embodiment the disintegrative particles are predominantly metallic particles, such as those made from sintered and/or compacted metal powders. The dissolvable particles may be spherical, elongated, rod-like or another geometric shape. Elongated particle shapes are expected to leave channel-shaped void spaces in the proppant pack, which can increase fracture conductivity. These may be either uncoated or coated. Uncoated particles could be reactive metals such as magnesium, aluminum, zinc, manganese or their alloys, or metals with disintegration enhancement additives. Coated particles may have a core and a coating. The core could be of metals such magnesium, zinc, aluminum, tungsten and other metals. The coating could be of nickel, aluminum, alumina and many other compositions. The coating could be such that it accelerates or decelerates the disintegration. These particles could be such that they disintegrate either partially or completely with time. The disintegration rate may be controlled by the composition of the fracturing fluid, such as type and amount of acids or salts present. Once disintegrated the skeleton structure constituting of non-disintegrated or un-dissolved or conventional proppant particles will be retained. In another non-limiting embodiment, the particles may have a "skeleton structure" with one disintegration rate around which another portion of the particle may be placed which has a second, different, disintegration rate. The resultant conventional proppant pack with unique void structures created by the disintegrative particles would continue to inhibit or prevent the fracture from closing off. Once disintegrated, it is conceived that net porosity and permeability of the proppant pack will increase fairly uniformly through the fracture zones compared to an otherwise identical structure where no disintegration takes place. The fracturing fluid can be fresh water or brine gelled with polymers and/or by viscoelastic surfactants, or a fluid containing an acid or acid gas. For example in a two-stage process; disintegration control may be accomplished through careful selection of the particles and the fluids used. For instance, a brine may remove a first coating of the particle, whereas an acid-containing fluid may subsequently disintegrate the rest of the particle.

In an alternative procedure, it is conceived that these disintegrative particles may be designed to be triggered by a certain kind of stimulation or cleanup fluid. After the proppant is placed in the hydraulic fractures or cracks, a subsequent dosing of stimulation or cleanup fluid, different from the fracturing, carrier or placement fluid, will trigger the dissolution of the disintegrative particle phase. This additional stimulation fluid treatment may be an acid or brine or seawater or even heated water or steam, or even fresh water— something that provides chemical and/or physical stimuli for dissolvable material to be triggered. The acid may be a mineral acid (where examples include, but are not necessarily limited to HCl, $H_2SO_4$, $H_3PO_4$, HF and the like), and/or an organic acid (where examples include, but are not necessarily limited to acetic acid, formic acid, fumaric acid, succinic acid, glutaric acid, adipic acid, citric acid, and the like). In another embodiment, the acid or brine may be as the internal phase of an emulsion stimulation or cleanup fluid as one method of target release of the corrosive liquid.

Shown in FIG. 1 are a single proppant 10, one version of a particle 12 that is completely disintegrative and an alternate embodiment of a particle 14 that has a portion 16 that is disintegrative at one rate and a portion 18 that is disintegrative at a second rate. In the particular, alternative embodiment of particle 14 shown in FIG. 1, particle 14 has a generally central core 18 that is relatively more slowly disintegrative as compared to portion 16, which is relatively more rapidly disintegrative and is a relatively uniform coating over the generally central core 18. It should be understood that the rates of disintegration between portion 16 and portion 18 may be reversed, or in a different embodiment that portion 18 is essentially not disintegrative in the process. However, it will be appreciated that particle 14 may have other configurations, for example disintegrative portion 16 may not be uniformly applied over generally central core 18. In one non-restrictive version, the disintegrative coating ranges from about 10 nm independently to about 500 nm thick, alternatively from about 10 nm independently to about 5000 nm thick. When the term "independently" is used herein with respect to a parameter range, it is to be understood that all lower thresholds may be used together with all upper thresholds to form suitable and acceptable alternative ranges. These coatings may be formed by any acceptable method known in the art and suitable methods include, but are not necessarily limited to, chemical vapor deposition (CVD) including fluidized bed chemical vapor deposition (FBCVD), as well as physical vapor deposition, laser-induced deposition and the like, as well as sintering and/or compaction. In another non-limiting version, the particle may be formed of two approximately equal, or even unequal, hemispheres, one of which is a relatively insoluble portion 18 and the other of which is a relative dissolvable portion.

Figure 8:
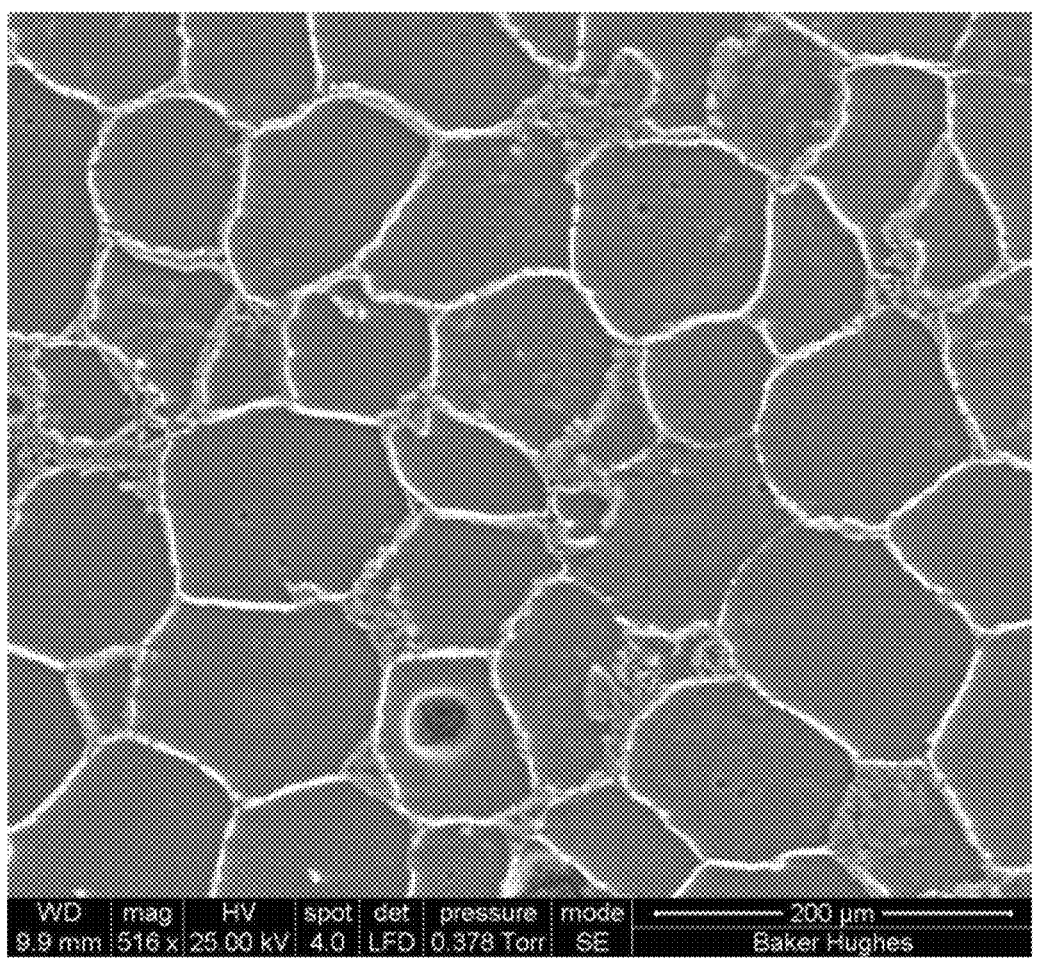
FIG. 8 is a photomicrograph of a portion of a metallic powder compact, such as may compose particle 40 of FIG. 1.

Also shown in FIG. 1 is a different embodiment of the particle, compact particle 40 having powder particle cores 36 and a thin metallic coating layer 38 thereon, similar to that shown in the Figures of U.S. Patent Application Publication No. 2011/0135953 A1, incorporated by reference herein in its entirety, particularly FIGS. 9, 11, 12, 13 and 14; FIG. 9 therein is reproduced here as FIG. 8. Such particles 40 do not have a coating over the entire particle 40. Particles 40 will be reduced in size or disintegrated uniformly once disintegration occurs.

In a different non-limiting embodiment, the particles of FIG. 1 may be engineered to have increased strength compared to conventional proppants, at least up until disintegration. In a non-limiting example, the portion 16 may be ceramic and the portion 18 may be metal. Optimized coating layer or layers also may reduce the amount of erosion on disintegrative particles during the proppant transport and placement processes.

It will be further understood that although proppant 10 and particles 12 and 14 are shown as spheres, they may be other shapes including, but not necessarily limited to, irregular rod-like, acicular, dentritic, flake, nodular, irregular, and/or porous. Including elongated versions of these, and the like with and without smoothed corners, and still be effective as described herein. In another non-limiting version, the particle may be hollow or porous.

The aspect ratio of the elongated versions may range from a mean particle length to mean particle diameter of about 2:1 to about 40:1. In one non-limiting embodiment, these elongated particles may be manufactured by extruding the raw materials and then chopping the extruded strand into pieces to give the desired aspect ratio.

In another non-restrictive embodiment, the disintegrative portions of particles 12 and 14 are made from a disintegrative metal sintered and/or compacted from a metallic composite powder comprising a plurality of metallic powder particles. These smaller powder particles are not to be confused with particles 12 and 14. Each powder particle may comprise a particle core, where the particle core comprises a core material comprising Mg, Al, Zn or Mn, or a combination thereof, having a melting temperature ($T_P$). The powder particle may additionally comprise a metallic coating layer disposed on the powder particle core and comprising a metallic coating material having a melting temperature ($T_C$), wherein the powder particles are configured for solid-state sintering to one another at a predetermined sintering temperature ($T_S$), and $T_S$ is less than $T_P$ and $T_C$. Alternatively, $T_S$ is slightly higher that $T_P$ and $T_C$ for localized micro-liquid state sintering, By "slightly higher" is meant about 10 to about 50° C. higher than the lowest melting point of all the phases involved in the material for localized micro-liquid sintering.

There are at least three different temperatures involved: $T_P$ for the particle core, $T_C$ for the coating, and a third one $T_{PC}$ for the binary phase of P and C. $T_{PC}$ is normally the lowest temperature among the three. In a non-limiting example, for a Mg particle with aluminum coating, according to Mg—Al phase diagram, $T_P$=650° C., $T_C$=660° C. and $T_{CP}$=437 to <650° C. depending on wt % ratio of the Mg—Al system. Therefore, for completed solid-state sintering, the predetermined process temperature needs to be less than $T_{PC}$. For micro-liquid phase sintering at the core-coating interface, the temperature may be 10-50 degree C. higher than $T_{PC}$ but less than $T_P$ and $T_C$. A temperature higher than $T_P$ or $T_C$ may be too much, causing macro melting and destroying the coating structure.

Again, further details about making these dissolvable metal portions may be had with reference to U.S. Patent Application Publication No. 2011/0135953 A1, incorporated by reference herein in its entirety. Again, attention is directed to FIG. 8 herein which is a microphotograph of a powder compact which may compose particles such as those like 40 in FIG. 1.

Shown in FIG. 2 is a subterranean formation 20 having a wellbore 22 drilled therethrough. At least one fracture 24 extends from the wellbore 22 into the formation 20. As a practical matter, a plurality of fractures 24 would extend from the wellbore 22 into the formation 20, but for simplicity only one is schematically illustrated. As shown in FIG. 2, a mixture of a plurality of proppants 10 and a plurality of particles 12 (in this non-limiting example, completely disintegrative particles 12) have been introduced into at least a portion of fracture 24 (in this non-limiting illustration essentially all of fracture 24) as a proppant pack 26. In another non-limiting embodiment a composition is introduced into at least a portion of the fracture 24 where the composition comprises the mixture of a plurality of proppants 10 and a plurality of particles 12 and other conventional compounds used in fracturing or completion fluids. The distribution of proppants 10 and particles 12 shown in FIG. 2 is relatively uniform, although it will be understood that the distribution does not have to be uniform or homogeneous in case different permeabilities and porosities are desired in different areas of the fracture proppant pack. For instance, to achieve a relatively uniform distribution, the density of the proppants 10 and the particles 12 should be the same or approximately the same. Particles 12 may have reduced density if they are made of a relatively less dense metal, for instance primarily magnesium, and/or are of a relatively less dense physical structure, for instance are hollow. If a non-uniform distribution is desired, particles 12 may be relatively more or less dense than proppants 10.

"Essentially all of a fracture" may be defined herein as at least 90 vol %, alternatively at least 95 vol %, and in another non-limiting embodiment at least 99 vol %.

As schematically illustrated in FIG. 2, the proportion of proppants 10 is greater than that of completely disintegrative particles 12. In one non-limiting embodiment, the proportion of proppants in the total combined proppants and particles ranges from about 60 independently to about 99 vol %. In an alternate, non-restrictive version, the proportion of proppants in the total combined proppants and particles ranges from about 80 independently to about 98 vol %.

The proppants 10 need not be the same or approximately the same size as the completely dissolvable particles 12 (although they are shown as such in FIGS. 1 and 2), or the same size as particles 14 (which are shown in FIGS. 1 and 4 as larger than proppants 10). In one non-limiting embodiment, average particle size of the particle 12 compared to the average particle size of the proppant 10 may range from about 5% independently to about 500%, alternatively from about 50% independently to about 200%. Alternatively, the disintegrative metal particles 12 and 14 may be larger than the proppants 10. In the case of particles 14, in an alternate embodiment, having only a portion of which is disintegrative, which may give a structure such as that shown in FIG. 5, the average particle size of the central core 18 compared to the average particle size of the proppant 10 may range from about 5% independently to about 500%, alternatively from about 50% independently to about 200%.

After placement of the proppant pack 26, at least a portion of the disintegrative particles 12 are disintegrated and removed therefrom. This may be accomplished by the fracturing fluid or formation brine in non-limiting embodiments. The fracturing fluid may contain corrosive material, such as select types and amounts of acids and salts, to control the rate of disintegration of the particles. In another embodiment this can be accomplished by removing or displacing the fracturing fluid or the carrier fluid or the placement fluid that introduced the proppant pack into the fracture 24 and subsequently introducing a different fluid to dissolve the dissolvable particles 12. This subsequent fluid may suitably be, but is not necessarily limited to, fresh water, brines, acids, hydrocarbons, emulsions, and combinations thereof so long as it is designed to dissolve all or at least a portion of the dissolvable particles 12. While all of the disintegrative particles 12 may be removed, as schematically shown in FIG. 3, as a practical matter in an alternate embodiment it may not be possible to contact and disintegrate all of the dissolvable particles 12 with the subsequent fluid and thus remove or disintegrate all of them.

However, in all embodiments it will be appreciated that by removing at least a portion of, and acceptably all of, the disintegrative particles 12 from the proppant pack 26 that the resulting proppant pack 26' of FIG. 3 has a relatively higher permeability as compared with the proppant pack 26 prior to the disintegrating (e.g. dissolving) of the disintegrative (e.g. dissolvable) particles 12. This is schematically illustrated by more open space in FIG. 3. In one non-limiting embodiment, the increase in permeability of proppant pack 26' is at least 100% over the original proppant pack 26, alternatively at least 50%, and in another non-limiting embodiment at least 10%.

Figure 6:
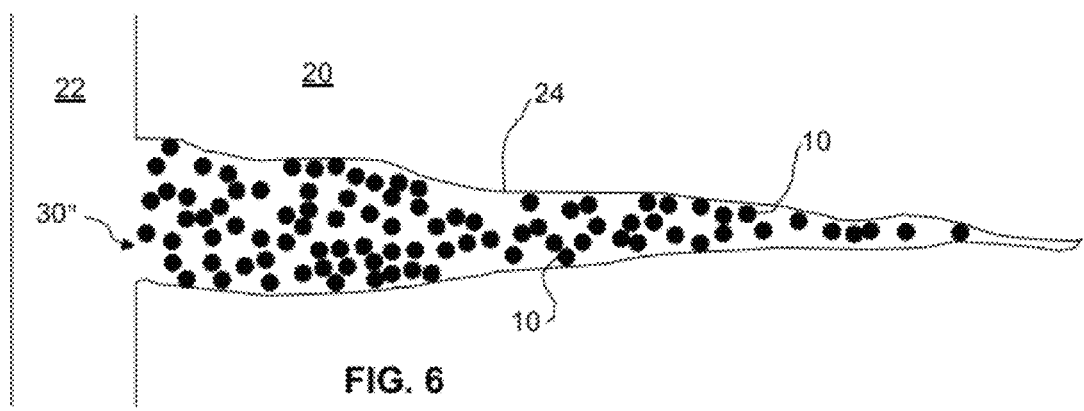
FIG. 6 is a schematic illustration of the fracture depicted in FIG. 5 after the disintegrative cores have been completely removed from the fracture.

Shown in FIG. 4 is an alternate proppant pack 30 composed of proppant 10 and particles 14 having a relatively more disintegrative portion 16 (e.g. coating) as part of the particles 14. Again, as in the case of the proppant pack 26 in FIG. 2, the greater proportion of the proppant pack 30 is proppant 10, with a smaller proportion (less than half) being the particles 14. After the placement of the proppant pack 30 shown in FIG. 4, the fracturing fluid or formation brine or both may remove the relatively more disintegrative coating 16 from particle 14. Alternatively, after the fracturing, placement or carrier fluid is removed, leaving the proppant pack 30 in place, a subsequent fluid, such as a brine, fresh water, acid or other fluid in which the relatively more disintegrative portion 16 is flushed through or introduced into the proppant pack 30 as a method to disintegrate as much of the disintegrative portion 16 as possible to give proppant pack 30' shown in FIG. 5. It is not necessary to use a subsequent treatment fluid to trigger disintegration of coating 16, but this may be an alternative. The fracturing fluid may be effective itself and can be adjusted in salinity, etc. to remove coating 16. In both embodiments of disintegrating coating 16, it is desirable to remove all or at least a portion of the disintegrative portion 16 from particles 14. Nevertheless, it is expected that the resulting proppant pack 30' will have a relatively higher permeability as compared with the proppant pack 30 prior to dissolving the dissolvable portions 16. Again, this is schematically illustrated by more open space in FIG. 5. Note that portions (cores) 18, which have a different rate of disintegration than portions 16 will remain (as seen within FIG. 5). However, in a second expected commercial embodiment of the method, the cores 18 (whether or not relatively more disintegrative than coating 16) are themselves disintegrated to give the structure as seen in FIG. 6. Proppant pack 30" of FIG. 6, where all of particles 14 are removed, has an even greater permeability than that of proppant pack 30' shown in FIG. 5.

It is contemplated that the same fluid used to disintegrate coating 16 may also be used to disintegrate cores 18. The proppant pack 30" of FIG. 6 may optionally be formed from proppant pack 30' in a subsequent operation using a different fluid than that used to disintegrate portions 16 that is passed through contacts proppant pack 30' to disintegrate and remove portions 18.

It will also be appreciated that a proppant pack may be formed of a mixture of proppant 10, particles 12 that are completely dissolvable and particles 14 and/or particles 40 that have a portion thereof which is disintegrative to also create a proppant pack having increased permeability after at least a portion thereof is disintegrated.

It will be additionally appreciated that in one non-limiting embodiment the fluid that disintegrates the disintegrative particles or the relatively differently disintegrative portions of the particles may be a fluid that may also be a stimulation fluid, such as an acid, in which case the fluid would have a dual function. It is further understood that the disintegrative particles (or portions thereof) may be designed to be triggered by a certain kind of stimulation fluid. After the proppant is placed in the fractures, a subsequent dosing of stimulation fluid will trigger the disintegration of the disintegrative particles, or alternatively certain portions thereof. This additional stimulation fluid treatment may be an acid, brine or seawater or even heated water or steam—a fluid that provides chemical and/or physical stimuli for the disintegrative material to be triggered or disintegrated. Such a fluid would also dissolve a certain portion of the rock matrix of subterranean formation 20 thereby stimulating hydrocarbon production therefrom.

Further it should be understood that the proppants 10 may be any of the conventional or to-be-developed materials for proppants. Suitable proppant materials include, but are not necessarily limited to, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design required. Proppants may range in average particle size from about 50 independently to about 2500 microns in diameter; alternatively from about 200 independently to about 1200 microns in diameter. Additionally, the approximate amount of dissolvable particles utilized compared to the volume of conventional proppant particles is about 1% to about 40%; and alternatively from about 1% to about 20%.

The invention will now be illustrated with respect to certain examples which are not intended to limit the invention in any way but simply to further illustrate it with certain specific embodiments.

EXAMPLES

Figure 7:
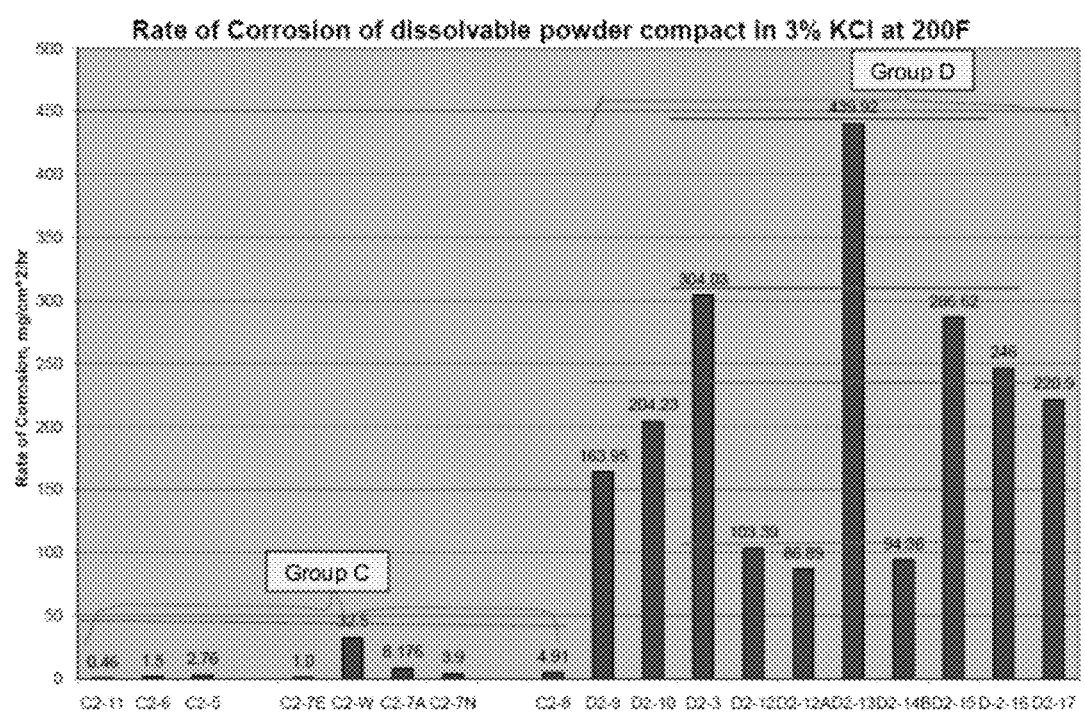
FIG. 7 is a graph of the rate of corrosion of various different disintegrative materials in 3% KCl at 200° F. (93° C.)

Shown in FIG. 7 is a graph of the rate of corrosion of various different disintegrative high strength materials in 3% KCl at 200° F. (93° C.). The disintegrative materials of Group C have a relatively low corrosion rate, whereas the disintegrative materials of Group D have a relatively high corrosion rate. Thus, disintegrative particles 12 and the dissolvable portions 16 and 18 of particles 14 may be suitably made of the metal materials of either Group C or D, depending on how quickly the particles, or portions of particles, are to be disintegrated. All of these are forged powder compacts made in accordance with U.S. Patent Application Publication No. 2011/0135953 A1, incorporated by reference herein in its entirety. Thus, 3% KCl at 200° F. (93° C.) may be suitably used as the subsequent fluid solvent in the above examples of FIGS. 2 and 3; and 4 through 6.

In the foregoing specification, the invention has been described with reference to specific embodiments thereof, and has been demonstrated as effective in providing methods and compositions for improving and increasing the permeability of proppant packs, while also optionally stimulating the formation. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of proppants, disintegrative particles, carrier or fracturing fluids and disintegration fluids and other components falling within the claimed parameters, but not specifically identified or tried in a particular composition or method, are expected to be within the scope of this invention. Further, it is expected that the components and proportions of the proppants and disintegrative particles or portions thereof and procedures for forming relatively high permeability proppant packs may change somewhat from one application to another and still accomplish the stated purposes and goals of the methods described herein. For example, the methods may use different pressures, pump rates and additional or different steps than those mentioned or exemplified herein.

The words "comprising" and "comprises" as used throughout the claims is interpreted "including but not limited to".

The present invention may suitably comprise, consist or consist essentially of the elements disclosed and may be practiced in the absence of an element not disclosed. For instance, a method for increasing the permeability of proppant pack within a fracture may consist of or consist essentially of introducing into at least a portion of a fracture in a subterranean formation a mixture of a plurality of proppants and a plurality of particles to form a proppant pack, where at least a portion of the particles is disintegrative, where the method further consists of or consists essentially of disintegrating at least a portion of the particles to create a proppant pack having a relatively higher permeability as compared with the proppant pack prior to the disintegrating.

Alternatively, a mixture useful herein may consist of or consist essentially of a plurality of proppants and a plurality of particles, where at least a portion of the particles is disintegrative metal.

What is claimed is:

1. A method for increasing the permeability of a proppant pack within a fracture, the method comprising:
    introducing into at least a portion of a fracture in a subterranean formation a mixture of a plurality of proppants and a plurality of particles to form a proppant pack, where at least a portion of the particles is disintegrative, where the disintegrative portion of the particles comprises disintegrative metal in the form of a compact of relatively less disintegrative powders, where the compact itself is relatively more disintegrative; and
    disintegrating at least a portion of the particles to create a proppant pack having a relatively higher permeability as compared with the proppant pack prior to the disintegrating.

2. The method of claim 1 where the particles are entirely disintegrative.

3. The method of claim 1 where the particles are selected from the group consisting of:
    a relatively less disintegrative portion and a relatively more disintegrative portion;

a relatively less disintegrative core and a relatively more disintegrative coating over at least a majority of the relatively less disintegrative core;

a relatively more disintegrative core and a relatively less disintegrative coating over at least a majority of the relatively more disintegrative core;

a compact of relatively less disintegrative powders, where the compact itself is relatively more disintegrative;

a disintegrative metal or alloy having disintegration enhancement additives; and combinations thereof.

4. The method of claim 3 where the particles have a core and a coating, and the disintegrative coating ranges from about 10 nm to about 5000 nm thick.

5. The method of claim 4 where the core consists magnesium, aluminum, zinc, manganese, molybdenum, tungsten, copper, iron, calcium, cobalt, tantalum, rhenium, nickel, silicon, rare earth elements, oxides thereof, nitrides thereof, carbides thereof, and alloys thereof and combinations thereof.

6. The method of claim 4 where the coating is selected from group consisting magnesium, aluminum, zinc, manganese, molybdenum, tungsten, copper, iron, calcium, cobalt, tantalum, rhenium, nickel, silicon, rare earth elements, oxides thereof, nitrides thereof, carbides thereof, and alloys thereof and combinations thereof.

7. The method of claim 4 where the disintegrative coating is formed by a process selected from the group consisting of chemical vapor deposition (CVD), fluidized bed chemical vapor deposition (FBCVD), physical vapor deposition, laser-induced deposition and combinations thereof.

8. The method of claim 1 where the disintegrative portion of the particles comprises disintegrative metal.

9. The method of claim 8 where the disintegrative metal is a sintered powder compact where the metal is selected from the group consisting of magnesium, aluminum, zinc, manganese, molybdenum, tungsten, copper, iron, calcium, cobalt, tantalum, rhenium, nickel, silicon, rare earth elements, and alloys thereof and combinations thereof.

10. The method of claim 8 where the disintegrative metal is sintered from a metallic composite powder comprising a plurality of metallic powder particles, each powder particle comprising:

a particle core, the particle core comprises a core material comprising Mg, Al, Zn or Mn, or a combination thereof, having a melting temperature ($T_P$); and a metallic coating layer disposed on the particle core and comprising a metallic coating material having a melting temperature ($T_C$), wherein the powder particles are configured for solid-state sintering to one another at a predetermined sintering temperature ($T_S$), and $T_S$ is less than $T_P$ and $T_C$, or for $T_S$ is slightly higher that $T_P$ and $T_C$ for localized micro-liquid state sintering.

11. The method of claim 1 where the proportion of proppants in the total combined proppants and particles ranges from about 60 to about 99 vol %.

12. The method of claim 1 where the particles have shapes selected from the group consisting of generally spherical, irregular rod-like, acicular, dentritic, flake, nodular, irregular, porous, hollow, elongated versions of each of these, and combinations thereof.

13. The method of claim 1 where the average particle size of the particle compared to the average particle size of the proppant ranges from about 50% to about 200%.

14. The method of claim 1 where the disintegrative portion of the particles is disintegrative in a fluid selected from the group consisting of fresh water, brines, acids, and combinations thereof.

15. The method of claim 1 where the proppants and the particles are distributed through the proppant pack generally uniformly.

16. A method for increasing the permeability of a proppant pack within a fracture, the method comprising:

introducing into at least a portion of a fracture in a subterranean formation a mixture of a plurality of proppants and a plurality of particles to form a proppant pack, where at least a portion of the particles is disintegrative, where the disintegrative portion of the particles comprises disintegrative metal in the form of a compact of relatively less disintegrative powders, where the compact itself is relatively more disintegrative, where the relatively less disintegrative powders comprise a plurality of metallic powder particles, where the powder particles comprise a particle core and a metallic coating layer disposed on the particle core; and disintegrating at least a portion of the particles to create a proppant pack having a relatively higher permeability as compared with the proppant pack prior to the disintegrating.

17. The method of claim 16 where the particles are selected from the group consisting of:

a relatively less disintegrative portion and a relatively more disintegrative portion;

a relatively less disintegrative core and a relatively more disintegrative coating over at least a majority of the relatively less disintegrative core;

a relatively more disintegrative core and a relatively less disintegrative coating over at least a majority of the relatively more disintegrative core;

a compact of relatively less disintegrative powders, where the compact itself is relatively more disintegrative;

a disintegrative metal or alloy having disintegration enhancement additives; and combinations thereof.

18. The method of claim 16 where the particles have a core and a coating, and the disintegrative coating ranges from about 10 nm to about 5000 nm thick.

19. A method for increasing the permeability of a proppant pack within a fracture, the method comprising:

introducing into at least a portion of a fracture in a subterranean formation a mixture of a plurality of proppants and a plurality of particles to form a proppant pack, where at least a portion of the particles is disintegrative metal, where the disintegrative metal is sintered from a metallic composite powder comprising a plurality of metallic powder particles, each powder particle comprising:

a particle core, the particle core comprises a core material comprising Mg, Al, Zn or Mn, or a combination thereof, having a melting temperature ($T_P$); and a metallic coating layer disposed on the particle core and comprising a metallic coating material having a melting temperature ($T_C$), wherein the powder particles are configured for solid-state sintering to one another at a predetermined sintering temperature ($T_S$), and $T_S$ is less than $T_P$ and $T_C$, or for $T_S$ is slightly higher that $T_P$ and $T_C$ for localized micro-liquid state sintering; and disintegrating at least a portion of the particles to create a proppant pack having a relatively higher permeability as compared with the proppant pack prior to the disintegrating.

20. The method of claim 19 where the particles are selected from the group consisting of:

a relatively less disintegrative portion and a relatively more disintegrative portion;

a relatively less disintegrative core and a relatively more disintegrative coating over at least a majority of the relatively less disintegrative core;

a relatively more disintegrative core and a relatively less disintegrative coating over at least a majority of the relatively more disintegrative core;

a compact of relatively less disintegrative powders, where the compact itself is relatively more disintegrative;

a disintegrative metal or alloy having disintegration enhancement additives; and combinations thereof.

* * * * *